(12) United States Patent
Greason

(10) Patent No.: US 10,892,799 B2
(45) Date of Patent: Jan. 12, 2021

(54) SYSTEMS AND METHODS FOR LONG-DISTANCE MOBILE WIRELESS POWER

(71) Applicant: Electric Sky Holdings, Inc., Mercer Island, WA (US)

(72) Inventor: Jeffrey Greason, Midland, TX (US)

(73) Assignee: Electric Sky Holdings, Inc., Mercer Island, WA (US)

( * ) Notice: Subject to any disclaimer, the term of this patent is extended or adjusted under 35 U.S.C. 154(b) by 0 days.

(21) Appl. No.: 16/183,227

(22) Filed: Nov. 7, 2018

(65) Prior Publication Data
US 2019/0140701 A1    May 9, 2019

Related U.S. Application Data

(60) Provisional application No. 62/582,940, filed on Nov. 7, 2017, provisional application No. 62/628,806, filed on Feb. 9, 2018.

(51) Int. Cl.
*H04B 5/00* (2006.01)
*H02J 50/10* (2016.01)
(Continued)

(52) U.S. Cl.
CPC ....... *H04B 5/0037* (2013.01); *G06K 7/10336* (2013.01); *G06K 19/07779* (2013.01);
(Continued)

(58) Field of Classification Search
CPC ..... H04B 5/0034; H04B 5/0037; H02J 50/10; H02J 50/40; G06K 7/10336
(Continued)

(56) References Cited

U.S. PATENT DOCUMENTS 7,714,791 B2 *  5/2010  Lavedas ............... H01Q 1/2216
                                                              343/742
2012/0010079 A1  1/2012  Sedwick
(Continued)

OTHER PUBLICATIONS

International Search Report and Written Opinion, for Application No. PCT/US2018/059639, dated Jan. 16, 2019, 14 pages.
(Continued)

*Primary Examiner* — Michael R. Fin
(74) *Attorney, Agent, or Firm* — Fish & Richardson P.C.

(57) ABSTRACT

Wireless power may be transferred between systems that are magnetically coupled in reactive near-field proximity. A magnetic field between a first antenna and a second antenna are coupled. The first and second antenna are (i) resonant at an operating frequency, and (ii) located within reactive near-field proximity. The reactive near field proximity represents a region that is less than a distance of 0.159 of the free space wavelength for the operating frequency. The wireless power provides a receiving system with a threshold amount of wireless inductive power exceeding 1 watt. Each of the first and second antennas have a spherical volume with a diameter less than 1/20 of the free space wavelength of the operating frequency and the energy dissipated to far-field radiation, per cycle, due to circulating currents from the first antenna is less than ½ the peak energy stored in the magnetic field.

37 Claims, 15 Drawing Sheets

(51) Int. Cl.
*G06K 19/077* (2006.01)
*G06K 7/10* (2006.01)
*H02J 50/40* (2016.01)

(52) U.S. Cl.
CPC .............. *H02J 50/10* (2016.02); *H02J 50/40* (2016.02); *H04B 5/0081* (2013.01)

(58) Field of Classification Search
USPC ........................................................ 307/104
See application file for complete search history.

(56) References Cited

U.S. PATENT DOCUMENTS

| | | |
|---|---|---|
| 2012/0091819 A1 | 4/2012 | Kulikowski |
| 2012/0256494 A1 | 10/2012 | Kesler |
| 2015/0255994 A1* | 9/2015 | Kesler .................... H02J 5/005 307/10.1 |
| 2016/0012966 A1 | 1/2016 | Davis |
| 2016/0285314 A1* | 9/2016 | Van Neste .............. H01F 38/14 |
| 2017/0069969 A1 | 3/2017 | Black et al. |

OTHER PUBLICATIONS

PCT International Preliminary Report on Patentability in International Appln. No. PCT/US2018/059639, dated May 12, 2020, 6 pages.

* cited by examiner

SYSTEMS AND METHODS FOR LONG-DISTANCE MOBILE WIRELESS POWER

RELATED APPLICATIONS

This application claims benefit of U.S. Provisional Application 62/582,940 filed Nov. 7, 2017, and U.S. Provisional Application 62/628,806 filed Feb. 9, 2018, the contents of both are incorporated herein in entirety.

TECHNICAL FIELD

This description is related to wireless power transfer.

BACKGROUND

Mobile and autonomous systems can be powered by batteries and fuel systems. Trends in mobile devices and electrical vehicles dramatically improved battery technologies. However, batteries and fuel systems may have an undesirable weight and performance profile.

SUMMARY

The disclosure describes systems incorporating an antenna structure to transmit power wirelessly to remote systems. More precisely, power may be supplied from a transmitting system that is magnetically coupled to a receiving system in reactive near-field proximity. The transmitting system supplies an alternating current at an operating frequency to a first antenna in order to create a magnetic field. In some cases, the first antenna refers to a transmitting system. In other cases, the first antenna refers to a receiving system. The first antenna is resonant at the operating frequency. The transmitting system is coupled to a magnetic field with a second system having a second antenna. The second antenna also resonates at the operating frequency, and is located within reactive near-field proximity. The reactive near field proximity represents a region that is less than a distance of 0.159 of a wavelength for the operating frequency away from the transmitting system. As a result, the transmitting system provides the receiving system with wireless inductive power. The wireless inductive power can exceed thresholds required to drive remote systems resident in the remote system, such as 1 watt circuits. The first antenna and the second antenna may fit within a spherical volume with a diameter less than 1/20 of the free space wavelength of the operating frequency. Further, the energy dissipated to far-field radiation, per cycle, due to circulating currents from the first antenna is less than ½ the peak energy stored in the magnetic field. Note that the transmitting and receiving systems should operate at the same resonant frequencies, the spherical volume of each system need not be the same.

The technology may be packaged in a variety of applications and use cases. For example, in one use case, the antenna and current driver may be specified to provide power over a long distance, for example, up to scores of meters (or even further). Such a use case can be used to provide electrical power to electric vehicles that travel on highways and draw power wirelessly from cables or transmitting antennas alongside the road. Accessing grid power on-the-go may be used to extend the range at which an electric vehicle can travel, alleviating consumer anxiety over the range of such vehicle that is otherwise a hindrance towards consumer acceptance. The antenna structure can also reduce battery weight, reducing energy consumption overhead for carrying the batteries. Other form factors and use cases may support remote charging of mobile devices, such as laptops and wireless phones. Still, other use cases may include industrial form factors (e.g., manufacturing), aerospace (e.g., aircraft, unmanned aerial vehicles and launch systems), railroad locomotives, and container shipping and other marine technologies The antenna of these implementations may incorporate a dipole configuration with a slow-wave end-loaded structure. Because some portion of the oscillating current is transiently stored in the self-capacitance at the ends of the antenna, rather than all of it returning in a closed loop, such structures couple to magnetic fields over longer ranges, for example, scores of meters away. The slow-wave structure of the antenna in these implementations reduces the resonant frequency allowing a short antenna to resonate at much lower frequencies than the physical dimensions of the antenna would suggest; the small overall dimensions minimize electromagnetic radiation to the radiative far field, permitting use of such structures in resonant inductive wireless power transfer. For context, some implementations of the disclosure operate at frequencies in the range from 10 KHz to 10 MHz. The operating frequency ranges of the antenna in these implementations are suitable for the intended wireless power transfer ranges, for example, scores of meters, which can correspond to, for example, $\lambda/2\pi$ (~0.159 wavelength) of the particular operating frequency and therefore qualify as a "reactive near field" region. Here, $\lambda$ corresponds to the wavelength of the operating frequency.

In one aspect, some implementations provide a method of operating a first antenna capable of magnetically coupling in reactive near-field proximity to a second antenna. The method includes coupling a magnetic field between the first antenna and the second antenna, the first and second antenna (i) resonant at an operating frequency, and (ii) located within reactive near-field proximity, wherein the reactive near field proximity representing a region that is less than a distance of 0.159 of the free space wavelength for the operating frequency; and providing a receiving system with a threshold amount of wireless inductive power exceeding 1 watt, wherein each of the first and second antennas have a spherical volume with a diameter less than 1/20 of the free space wavelength of the operating frequency; wherein the energy dissipated to far-field radiation, per cycle, due to circulating currents from the first antenna is less than ½ the peak energy stored in the magnetic field; and wherein one or both of the first antenna and the second antenna is a dipole resonant at the operating frequency.

Implementations may include one of more of the following features. Coupling the magnetic field and providing the receiving system with the threshold amount of power may be performed on a transmitting system. The method may further include: supplying, at the operating frequency driving the first antenna, an alternating current to create the magnetic field. Coupling the magnetic field and providing the receiving system with the threshold amount of power may be performed on the receiving system. The method may further include receiving an alternating current from the second antenna.

Coupling the magnetic field may include limiting energy dissipated to far-field radiation, associated with circulating currents in transmission, to less than one third of peak energy stored in the magnetic field on a per cycle basis. The operating frequency may be less than or equal to 10 MHz. One or both of the first and second antennas may have at least 10% of peak current for an alternating current for an unpaired wire that is not cancelled by an opposing current within the same antenna.

Coupling the magnetic field may include generating a magnetic field with a nonzero monopolar component. The method may further include preselecting the operating frequency. The method may further include using feedback tuning of one or both antennas to maintain the operating frequency in response to component tolerances, temperature variation, drift, or the proximity effect of other structures within the reactive near-field proximity. The method may further include varying the operating frequency to prevent unauthorized reception of inductive power.

One of the first antenna and the second antenna may be the dipole and one of the first antenna and the second antenna may be a coil, in which the dipole may be located asymmetrically to the coil. One or more of the first antenna and the second antenna may be configured in a dipole configuration with aggregated inductor and capacitive components on remote portions. One or more of the first antenna and the second antenna may include a configuration with a slow-wave transmission line on remote portions for the dipole. One or more of the first antenna and the second antenna may include a configuration with a folded end-loaded structure that includes a ferrite-core coil with capacitive loading between two halves of the remote portion end-loading structure for the dipole. One or more of the first antenna and the second antenna may include a configuration with a folded end-loaded structure that includes a ferrite-core coil with aggregated LC circuit matching at a fold in the end-loading structure for the dipole. One or more of the first antenna and the second antenna may include a configuration with a ferrite-filled transmission line with a shorted end for the dipole. One or more of the first antenna and the second antennas may include a configuration with a ferrite-filled transmission line where the center and shield conductors are connected at the end through an aggregated LC matching circuit for the dipole.

Providing the receiving system with a threshold amount of wireless inductive power exceeding 1 watt includes providing wireless inductive power exceeding 100 watts. The energy dissipated to far-field radiation, per cycle, due to circulating currents from the second antenna may be less than ½ the peak energy stored in the magnetic field.

In another aspect, some implementations provide a system operating a first antenna capable of magnetically coupling in reactive near-field proximity to a second antenna. The system including: the first antenna coupling a magnetic field between the first antenna and the second antenna, the first and second antenna (i) resonant at an operating frequency, and (ii) located within reactive near-field proximity, wherein the reactive near field proximity representing a region that is less than a distance of 0.159 of the free space wavelength for the operating frequency; and a power system associated with the first antenna providing a receiving system with a threshold amount of wireless inductive power exceeding 1 watt, wherein each of the first and second antennas have a spherical volume with a diameter less than $\frac{1}{20}$ of the free space wavelength of the operating frequency; wherein the energy dissipated to far-field radiation, per cycle, due to circulating currents from the first antenna is less than ½ the peak energy stored in the magnetic field; and wherein one or both of the first antenna and the second antenna is a dipole resonant at the operating frequency.

Implementations may include one or more of the following features. The first antenna and the power system may reside within a transmitting system, and the power system may supply, at the operating frequency driving the first antenna, an alternating current to create the magnetic field. The first antenna and the power system may reside within a receiving system; and the power system may receive an alternating current from the second antenna. The first antenna and the power system may limit energy dissipated to far-field radiation, associated with circulating currents in transmission, to less than one third of peak energy stored in the magnetic field on a per cycle basis.

The operating frequency may be less than or equal to 10 MHz. One or both of the first and second antennas may have at least 10% of peak current for an alternating current for an unpaired wire that is not cancelled by an opposing current within the same antenna. The first antenna may generate a magnetic field with a nonzero monopolar component.

The system may further include a frequency controller configured to preselect the operating frequency. The frequency controller may use feedback tuning of one or both antennas to maintain the operating frequency in response to component tolerances, temperature variation, drift, or the proximity effect of other structures within the reactive near-field proximity. The system may further include a frequency controller to vary the operating frequency to prevent unauthorized reception of inductive power.

One of the first antenna and the second antenna may be the dipole and one of the first antenna and the second antenna may be a coil, in which the dipole may be located asymmetrically to the coil. One or more of the first antenna and the second antenna may be configured in a dipole configuration with aggregated inductor and capacitive components on remote portions. One or more of the first antenna and the second antenna may include a configuration with a slow-wave transmission line on remote portions for the dipole. One or more of the first antenna and the second antenna may include a configuration with a folded end-loaded structure that includes a ferrite-core coil with capacitive loading between two halves of the remote portion end-loading structure for the dipole. One or more of the first antenna and the second antenna may include a configuration with a folded end-loaded structure that includes a ferrite-core coil with aggregated LC circuit matching at a fold in the end-loading structure for the dipole. One or more of the first antenna and the second antenna may include a configuration with a ferrite-filled transmission line with a shorted end for the dipole. One or more of the first antenna and the second antennas may include a configuration with a ferrite-filled transmission line where the center and shield conductors are connected at the end through an aggregated LC matching circuit for the dipole. The energy dissipated to far-field radiation, per cycle, due to circulating currents from the second antenna may be less than ½ the peak energy stored in the magnetic field

TERMINOLOGY

Figure 1A:
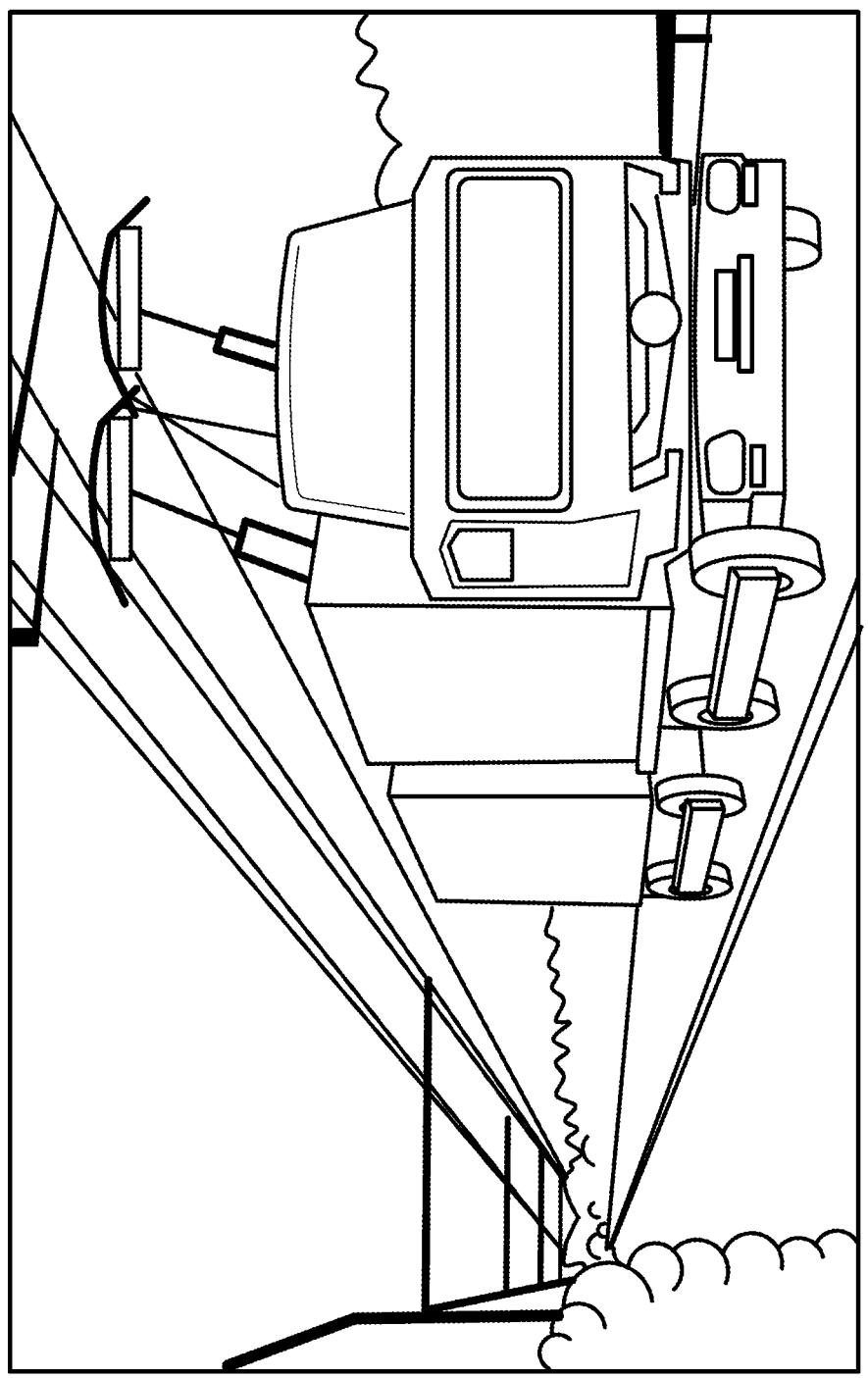
FIGS. 1A to 1B illustrates examples of prior art experiments to power moving vehicles.

Below are descriptions of some of the terms used in the Detailed Description and in the Claims:

"far field" refers to the region far enough from an antenna that the field is dominated by propagating electromagnetic waves, usually distances greater than or equal to $2\lambda$ (~2 wavelengths).

"$\lambda$" (pronounced lambda) refers to the wavelength of an electromagnetic wave.

"r" refers to the distance away from a wire. For example, $1/r^3$ refers to the inverse cube of the distance away from the wire.

"radiation resistance" refers to the part of the real impedance of an antenna which couples circulating current in the antenna in to far-field radiation, for short antennas this scales with (length/wavelength)$^2$.

"reactive near field" refers to the region around an antenna in which the electric and magnetic fields can be approximated as independent, neglecting propagating electromagnetic wave solutions, typically $\sim\lambda/2\pi$ (~0.159 wavelength) away from the antenna or less.

"single unpaired wire" refers to: (i) a single length of unpaired conductor, with no return loop carrying a flow of current, or (ii) where the return loop is present but the current on the return loop is less than that in the active element Note that a common electrical wire cord such as an extension cord, or a wire cord for a lamp or vacuum cleaner, is often a pair of wires forming a looped circuit.

A "slow-wave" structure is one in which the velocity of propagation of electromagnetic signals along the structure is well below the speed of light in a vacuum, so that the physical wavelength associated with a given frequency when propagating along the structure is much smaller than would be the case in free space.

DETAILED DESCRIPTION

Modern electric and electronic systems often seek to avoid or limit the form factor associated with power supply, including propulsion and on-board operations. Other devices would seek to use more electricity if more power were available. These devices face potential challenges between weight, power consumption, battery life, and battery cost.

The transfer of wireless power by magnetic induction involves a transmitter and a receiver, serving as, for example, the two halves of an air-core transformer that transfers electrical energy between two or more circuits through electromagnetic induction. In one example, the receiver and the transmitter are both of the "Hertzian dipole" or "differential amplitude circuit" type describe herein. In this example, the transmitter and the receiver couple to each other via the magnetic field. In another example, one of the receiver or transmitter can be a dipole described herein, and the other element can be a conventional coil. The transmitter and the receiver in this example likewise couple to each other via the magnetic field. In the case of using a coil as a transmitter, the dipole receiver can be positioned away from the center of the magnetic loop towards a proximal side to reduce the coupling to the distal side that tends to cancel out the action of the coupling to the proximal side. Power transfer may be more efficient when one element is placed closer to the wire of one side of the loop than to the wire of the opposite side (for example, at least a 2:1 ratio of distance). In comparison, when the dipole is more symmetrically placed inside the coil, power transfer approaches zero, as the signs of the couplings from the two sides of the loop are opposite, thus cancelling out each other. As an illustration, if the transmitter is a six (6) meter square loop and the receiver is a one (1) meter dipole, the dipole may be at most two (2) meters inside the loop. For example, the receiver can be placed two (2) meters away from the proximal side of the loop and four (4) meters away from the distal side of the loop. In another illustrative example, the dipole might be at most six (6) meters outside the loop, thus placing it six (6) meters away from the proximal side and twelve (12) meters away from the distal side.

In these examples of transmitting from a loop to a dipole, or from a first dipole to a second dipole, the current carrying elements are placed approximately parallel to each other such that the strength of the coupling is improved. Indeed, this coupling follows the cosine of the angle between the two current carrying elements. As such, zero degrees representing a perfectly parallel condition while perpendicular current carrying elements do not couple to each other.

Overview of the Electric Vehicle Environment

While various use cases are described with respect to electric vehicles, the claimed techniques may be employed in other use cases, applications, and configurations. Thus, while the present application describes implementations, for example, where electric vehicles are being pursued as a clean-tech vehicle technology, the techniques involving reactive near field communications systems may be applied to other areas of technology.

By way of illustration, electrical vehicles may be perceived to have limited driving range compared to petroleum cars. This limited range may force the owner to repeatedly stop-and-charge, causing a condition among potential consumers known in the automobile industry as range anxiety. In another challenge, electrical vehicles have batteries with long charge times, for example, including charge times that can vary between ½ hour to several hours when the electrical vehicles are stopped.

Numerous attempts to improving the charging bottleneck of electrical vehicles have been made, but with limited success. Batteries can store power, but have limited storage capacity, add weight to the vehicle, and add cost to the vehicle. Supplying power to vehicles using contact devices can be costly and require prohibitive infrastructure investments. In one illustration, trucks were configured with a special pantograph rack to make contact with power lines strung over highway lanes, as shown in FIG. 1A. In this illustration, the special rack on the trucks can maintain contact (and associated friction) with the overhead power lines as the truck moves. Such solution allows the moving track to draw power only when in the immediate contact of power lines, thereby limiting the usage.

Figure 1B:
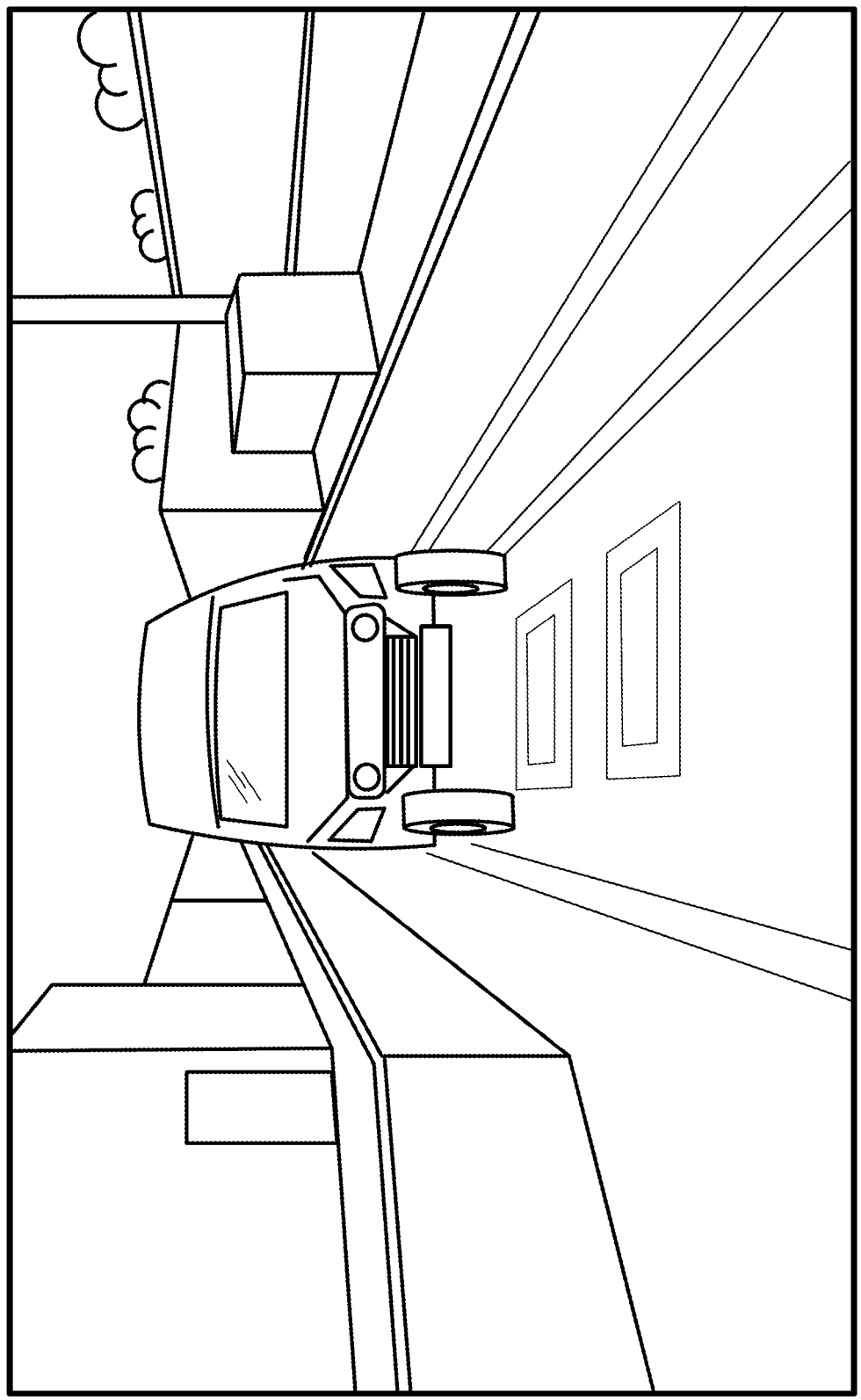

Vehicles may be powered using near-field resonant inductive coupling of two sets of inductive coils. As shown in FIG. 1B, a first set of inductive coils are embedded in a patch of a highway segment. The first set of inductive coils serve as transmitting coils to supply low power electricity to receiving coils mounted at the bottom of a car travelling over this segment. The receiving coil resonates at the same frequency as the transmitting (primary) coil. The receiving coil on a vehicle is known as the secondary inductive coil. In this illustration, the first set of inductive coils are embedded in roadways. In this configuration, the range of effective transmission, depending on antenna configuration and resonant frequency, is limited to just a few centimeters requiring the car's antenna to be mounted close to the road, reducing vehicle ground clearance. The vehicle must maintain acceptable alignment with the transmission coils while moving over the patch of the roadway. Any misalignment can further reduce efficiency, thereby decreasing the received power.

Wireless power transfer may be further limited by constraints on antenna technology. Coil-based systems may struggle with three challenges. First, coils may be limited to short wavelengths. Coils may operate in the reactive near field, for example, approximately 0.159 of the wavelength, to provide wireless energy. The shorter the wavelength, the smaller the region of the reactive near field, and so the closer the car must be to the transmitter.

Second, coils may cancel out or limit their own magnetic field. At short distances less than the diameter of the coil (which, in some configurations is often a distance of only a few centimeters), the magnetic field falls off merely with the inverse of distance. However, charge on opposite sides of the loop flows in opposite directions, which creates opposing magnetic fields. This, in turn, may cancel or reduce the magnetic field and coupling between remote systems at appreciable distances greater than a coil diameter. At distances away from the coil that are greater than one coil diameter, the magnetic field strength falls off quickly, at approximately the inverse cube of distance ($1/r^3$).

The above two factors detrimentally limit effective transmission proximate to the transmitter. A third challenge with coil technology is that transmission range is at its maximum when the receiver coil is symmetrical with the transmitter coil. In the case of vehicular power systems, the receiver size is limited by on-board packaging constraints. The transmitter size is thus limited to maintain symmetry with the receiver. As a result, it is sometimes difficult to make the transmitter large and powerful enough for the vehicle or device, or to allow for movement or misalignment between the transmitter and receiver.

Use of Dipole Antennas in Reactive Near-Field Inductive Power Transmission Systems Dipole antennas may launch radiated electromagnetic fields, which carry power away from the antenna in to the far field. That radiated power is distinct from the reactive power in the near field. The reactive power in the near field is available for inductive coupling. In some implementations, radiated power is undesirable, because this radiated power reduces the quality factor Q of the oscillator and thus reduces the magnetic field energy for a given input power (magnetic field energy in turn, through mutual inductance permits resonant magnetic coupling). In these implementations, power transfer does not rely on radiated power. In one illustrative example, radiated power can be reduced by making the overall length of the antenna structure very short compared to the transmitted wavelength (typically less than a tenth of a wavelength, for example, $\frac{1}{20}$, or $\frac{1}{12}$ of the wavelength). Reducing the overall length between the charge-accumulating ends of the antenna (where self-capacitance stores the charge delivered over a half a cycle before the current reverses) can decrease coupling to far-field radiation and enable the magnetic near field to be used productively for wireless power transfer. Here, the charge-accumulating ends refer to, for example, distal ends of a dipole structure where charges can accumulate.

Some implementations use an antenna structure in the form of "single" wire, rather than a loop of wire. To achieve current flow without a return loop to complete the "circuit", the antenna structure of these implementations is configured with a unique slow-wave load at each end, hence the term slow-wave end-loaded structure. Alternating current oscillates between the two ends of the antenna structure.

Some implementations use an antenna structure in the form of "single" wire, rather than a loop of wire. To achieve current flow without a return loop to complete the "circuit", the antenna structure of these implementations is configured with a unique slow-wave load at each end, hence the term slow-wave end-loaded structure. Alternating current oscillates between the two ends of the antenna structure.

In more detail, the slow-wave antenna structure of some implementations can advantageously address all three (and especially the latter two) of the disadvantages of coils. First, the antenna structure of some implementations can receive longer wavelengths. As current oscillates along an antenna wire at a rate of $1/\sqrt{LC}$ where L is the inductance per unit of that length of the wire (measured in Henries/meter), and C is the capacitance per unit length of the wire (measured in Farads/meter). Increasing L or C (or, ideally, both) can slow the rate of oscillation, reducing the speed of electromagnetic wave propagation along the wire (also sometimes called the "velocity factor"), launching an electromagnetic (EM) wave at the corresponding frequency and making a physically-short antenna structure appear "electrically longer." For example, a 100 kHz wave extends approximately 3,000 meters, and its reactive near field extends to approximately $\lambda/2\pi$ from the transmitter, in this example almost 477 meters. In this setting, a dipole antenna would have to be on the order of a half-wave (1500) meters long to be resonant at this wavelength, which may cause size/packaging constraints and/or challenges. Increasing $\sqrt{LC}$ of the end-loading structures by a factor of 100 or more reduces antenna length to the point where the size/packaging constraints are not impactful. This configuration in some implementations allows a short antenna to couple in the reactive near field over distances substantially longer than the physical size of the short antenna.

One advantage of the slow-wave end-loaded antenna structure in some implementations is that the slow-wave end-loaded antenna structure enables an architecture that does not cancel its own magnetic field. The capacitance at that the end of the antenna acts as a "sink," temporarily storing portions of current from each cycle. Current can oscillate back and forth between the two ends, reducing or even eliminating the need for a return loop to complete the circuit. Reducing or eliminating the return loop can minimize or even eliminate the cancelling magnetic field generated by the return loop. In the absence of this cancelling effect, magnetic field strength falls off with the inverse of square of distance (rather than the inverse cube of distance).

As a result, an antenna with a heavily end-loaded slow-wave structure in some implementations can capture useful magnetic field over scores of meters, allowing magnetic coupling over that same distance, and meaningful charging at that distance.

Figure 2A:
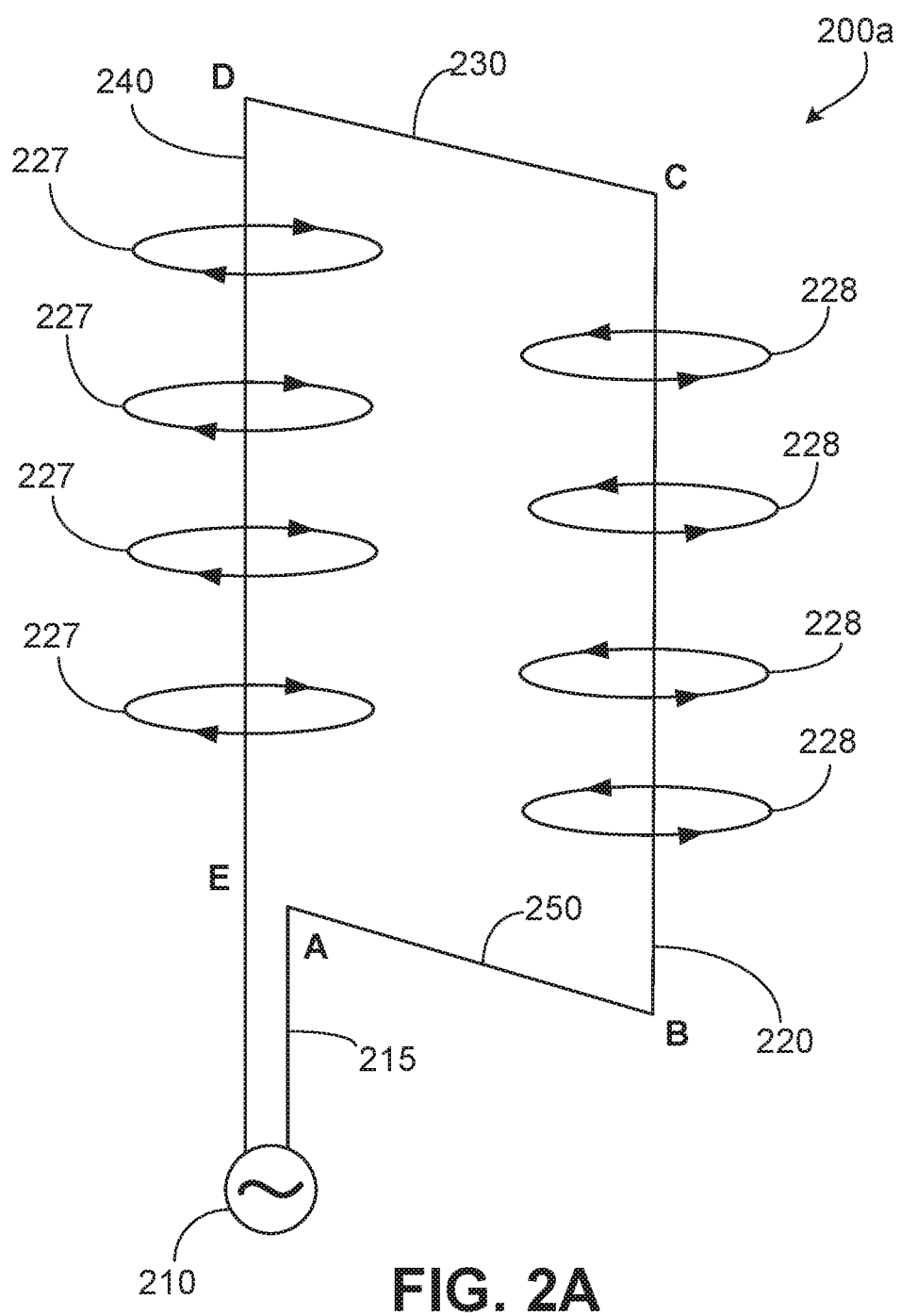
FIGS. 2A to 2C illustrate examples of prior art loop configurations for launching magnetic fields.
Figure 2B:
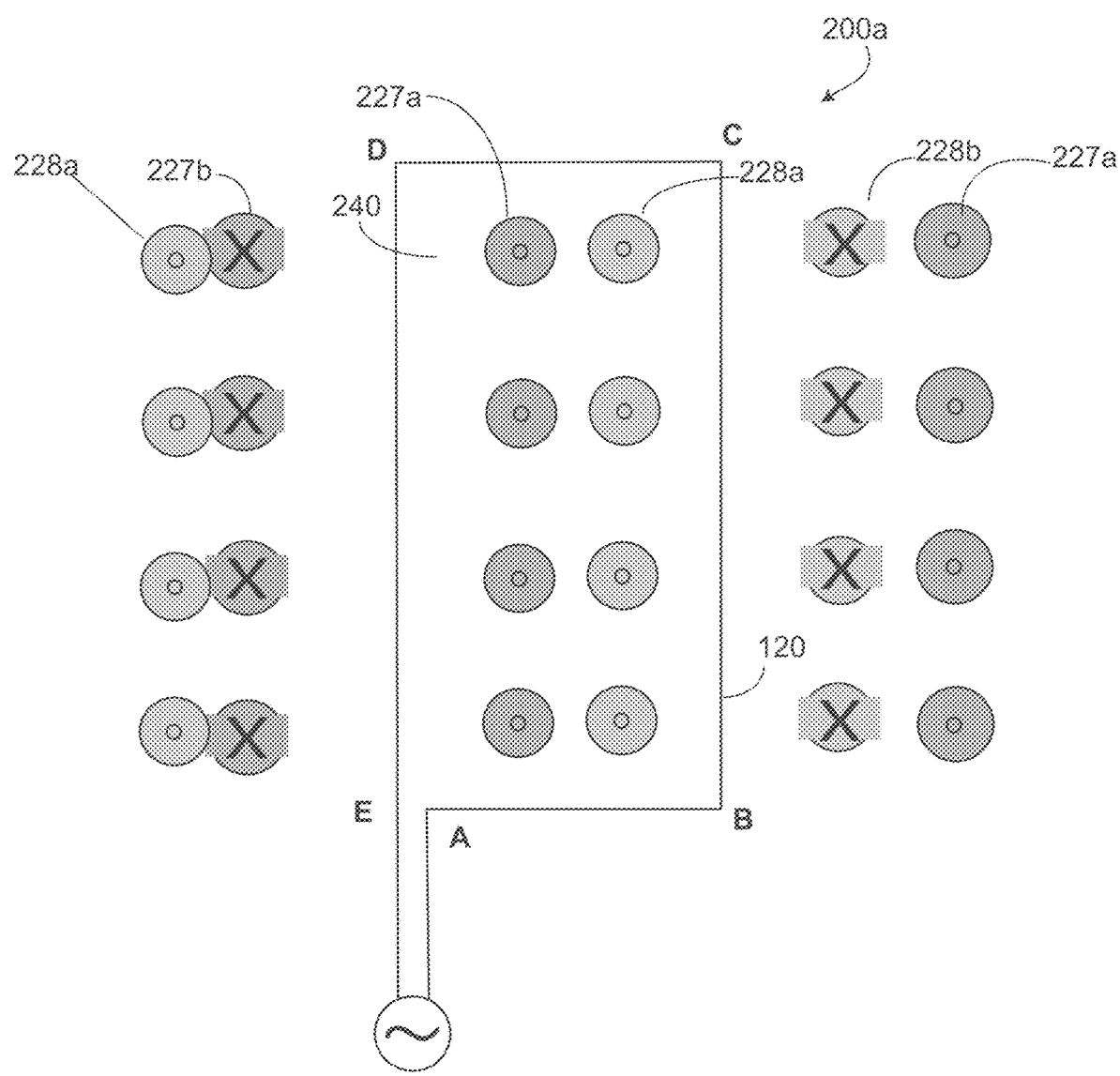
Figure 2C:
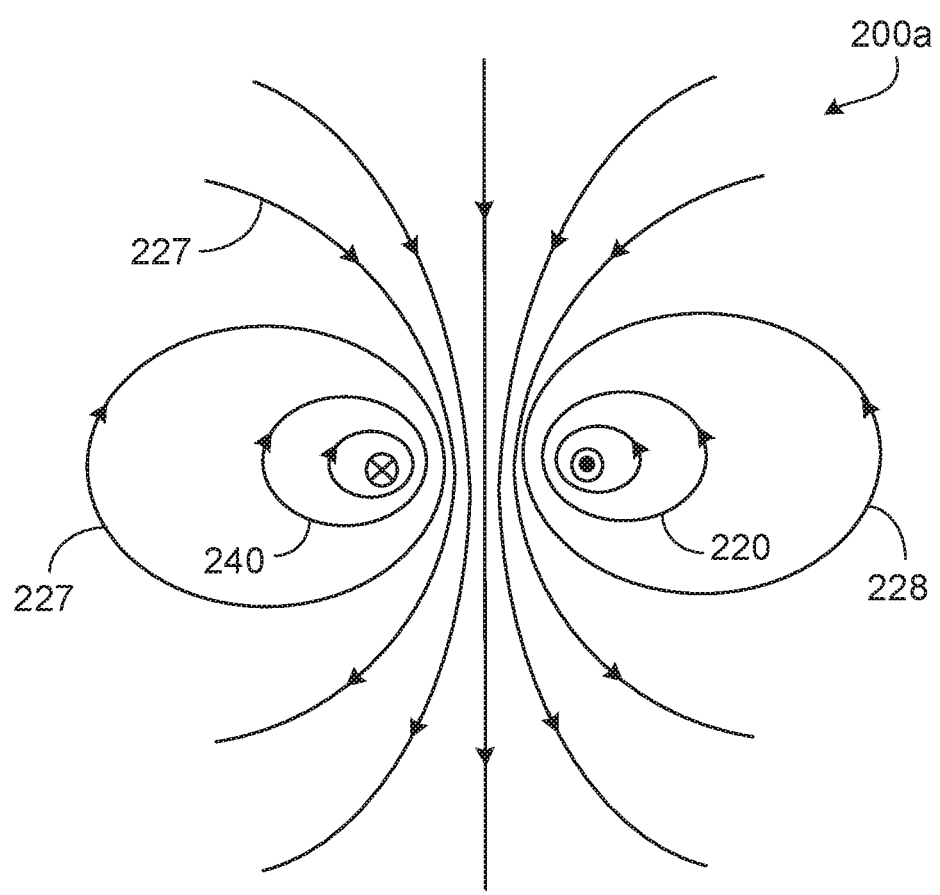

FIGS. 2A to 2C are representative illustrations of different views of the magnetic field intensity (H) or the magnetic flux density (B) around a conventional current-carrying loop or coil. In free space, the vector magnetic field intensity (H) and the vector magnetic flux density (B) are related by:

$$H = \frac{1}{\mu_0} B \tag{EQN. 1}$$

where $\mu_0$ is the permeability of free space.

A current-carrying wire generates a magnetic field around it. The magnitude of the magnetic flux density generated by such a current-carrying wire (aligned with its midpoint) is given by:

$$B = \frac{\mu_0 I}{4\pi r}\left[\frac{2\Lambda}{\sqrt{(4r^2 + \Lambda^2)}}\right] \quad \text{(EQN. 2)}$$

where B is the magnitude of the magnetic flux density, $\Lambda$ is the length of the wire segment, $\mu_0$ is the permeability of free space, and r is the distance from the wire segment at which the magnetic field is measured. Within this disclosure, unbolded variables such as "B" denote scalar quantities, and bolded variables such as "B" denote vector quantities.

At a small distance r from the wire, the magnetic field B falls off with the inverse of the distance away from the wire (1/r). Moving further away from the wire, the magnetic field falls off with the square of the inverse of the distance away from the wire (1/r$^2$).

Referring to FIG. 2A, magnetic field lines 227, 228 represent the magnetic field generated by current-carrying loop or coil 200a when the current is generated from an AC (alternating current) generator 210. The magnetic field lines are indicated by arrows. Here, the current-carrying wire loop generates a dipole magnetic field. In this example, the dipole component of the wire loop's magnetic field is symmetric about the direction of its magnetic dipole moment.

To better explain the implementations of the current disclosure, some clarifications of the terminology are provided below. A single, unpaired wire with a uniform current flowing from end to end is referred to as a "Hertzian dipole" or "current element". However, one also can describe an electric or magnetic field in terms of the various spherical harmonics that describe it—with a spherically symmetric component being a "monopolar" component, a component with two opposite sign poles a "dipolar" field, the next higher harmonic being a "quadupolar" field, and so on. While "magnetic monopoles" which would produce a static "monopolar" field do not exist, the magnetic field produced by a "Hertzian dipole" or unpaired "current element" is a time-varying field with a "monopolar" component. Unlike dipolar fields, where field strength falls off at 1/r$^3$, monopolar field strength of such "Hertzian dipole" (or unpaired "current element") falls off at 1/r$^2$. A conventional current loop produces a dipolar field, because the monopolar fields are canceled out by the opposite signs of currents flowing on opposite sides of the loop. While a pure, idealized "Hertzian dipole" would make a field with monopolar components, the same is true for any "unpaired" current. For example, a complete circuit in which the current flowing in one side of the loop was, by any means, not equal to the current flowing in the other side of the loop will have an "unpaired" current equal to the difference between the currents on the two sides of the loop. In this example, that portion of the "unpaired" current gives rise to a monopolar magnetic field, which can provide mutual inductance to another magnetic element.

Some implementations may leverage the fact that non-radiative near-field behaviors of magnetic fields dominate close to the antenna or scattering object, while electromagnetic radiation far-field behaviors dominate at greater distances. Aspects of the desired near-field region may extend and have practical benefit for some distance beyond the specified near-field distance (e.g., for roughly one wavelength $\lambda$). Within the near field, the reactive near-field region is roughly the distance equal to one wavelength $\lambda$ divided by $2\pi$ (i.e., $\lambda/2\pi$), or approximately 0.159 of the wavelength.

Referring to FIG. 2A, at a given point in time, an alternating current from the generator 210 flows from point A to B (first leg 250), B to C (second leg 220), C to D (third leg 230), and D to E (fourth leg 240). The resulting magnetic field circulates around the coil clockwise on the second leg 220 as shown by magnetic field lines 228, and anti-clockwise on the fourth leg 240 as shown by magnetic field lines 227. As shown in FIG. 2A, the loop 200a is viewed at an angle, and projects out of the plane of the page.

FIG. 2C shows the circulation of the magnetic fields when the loop 200a is viewed from above. The second leg 220 is represented as a dot (indicating current coming out from the plane of the page), and the fourth leg 240 is represented as a cross (indicating current going into the plane of the page). In FIG. 2B, when the loop 200a is viewed head-on (rather than at an angle, as shown in FIG. 2A), the magnetic field is seen to "exit" at the center of the loop, as denoted by dots 227a and 228a, and "enter" at the left and right of the loops, as denoted by crosses 227b and 228b.

With continued reference to FIG. 2B, the second leg 220 creates a clockwise circulating magnetic flux, whereas the fourth leg 240 creates an anti-clockwise circulating magnetic flux. As a result, in the region between the second and fourth legs, 220, 240, the two magnetic fields reinforce each other. However, in the region to the left of the fourth leg 240, and to the right of the second leg 220, the magnetic field from the second leg 220 tends to cancel out the magnetic field from the fourth leg 240 (and vice-versa). This effect limits the distance over which a magnetic field generated by either the second leg 220 or the fourth leg 240 can be transmitted.

Throughout this disclosure, the "characteristic dimension" for a loop refers to four times the area enclosed by the loop, divided by the perimeter of the loop. For a non-loop arrangement, the characteristic dimension refers to the length of the active element, as described in further detail. For example, the characteristic dimension of a wire loop having the shape of a rectangle is the length of the shorter side of the rectangle (or, in the case of a square, the length of any side of the square).

In the case of an infinitely long current carrying wire (equivalently, one where the distance to each end of the wire is very long compared to the distance to the measurement point).

$$B = \frac{\mu_0}{2\pi}\left(\frac{I \times \hat{r}}{|r|}\right) \quad \text{(EQN. 3)}$$

In this case, field falls off as 1/|r|.

Throughout this disclosure, the portions of the circuit in which the magnetic field is reduced or suppressed are referred to as "return elements," and the portions of the circuit in which the magnetic field is not reduced or suppressed are referred to as the "active element."

The higher the ratio of the strength of the magnetic field generated by the active element to the strength of the magnetic field generated by the return element, the lower the degree to which the magnetic field generated by the return element cancels out the magnetic field generated by the active element, and the more the magnetic field generated by the active element has a tendency to fall off at the rate described by EQN. 2 above at distances greater than two characteristic dimensions. This technique can therefore dramatically extend the range a magnetic field can be projected, as will be discussed in further detail below in FIGS. 3-7.

With the above introduction, some implementations provide an amplitude differential circuit. Such implementations include reducing the degree to which the return element's magnetic field cancels out the active element's magnetic field by using a time-varying current (e.g., alternating current or AC) to create an amplitude differential between the active element and the return element within the overall circuit. This amplitude differential reduces the tendency of the magnetic field generated by the return element to cancel the magnetic field generated by the active element.

Amplitude differential circuits can assume aspects of dipole antennas, as will be compared and contrasted below.

Figure 3A:
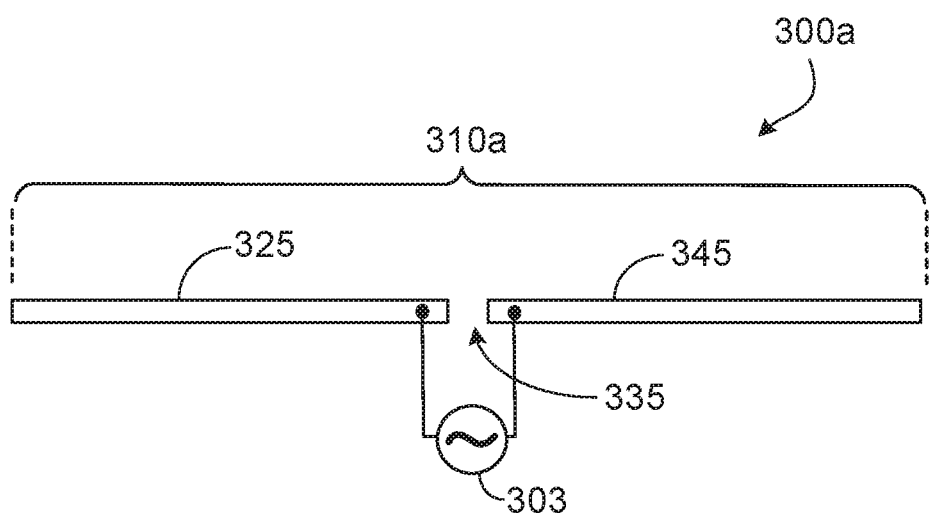
FIGS. 3A to 3B illustrate an example of a dipole configuration for launching magnetic field.
Figure 3B:
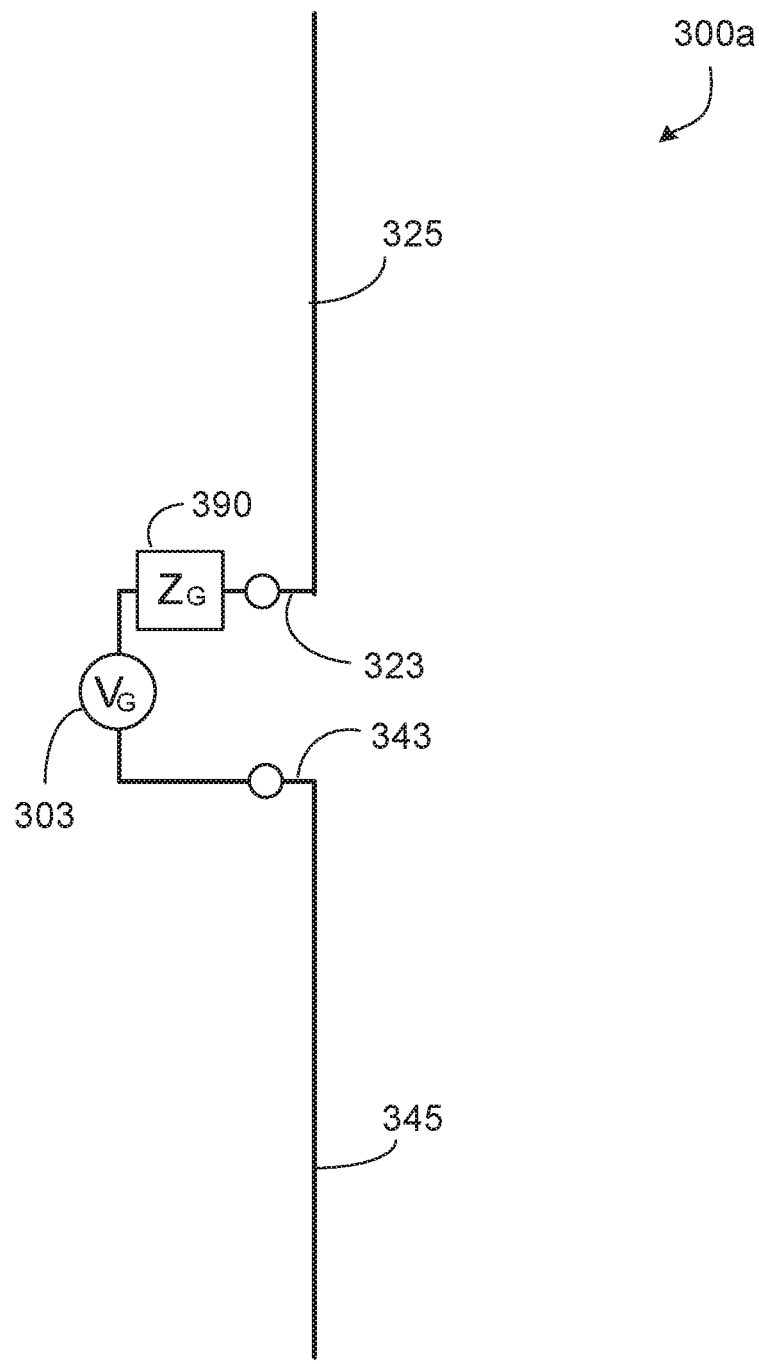

FIG. 3A is a representative illustration of a dipole antenna 300a. The dipole antenna is commonly fed at a location generally near the center 335 of the radiating elements. Each radiating element 325 and 345 has a length generally at or close to a quarter wavelength of the signal produced by the signal generator 303 and the sum of the lengths of the radiating elements 310a is at or close to half a wavelength 310a. In FIG. 3B, the dipole antenna 300a is shown with the source generator 303 having a source impedance 390 and transmission lines 323 and 343. The characteristic dimension of the dipole antenna in FIGS. 3A and 3B is the sum of the lengths of the radiating elements 325 and 345.

The quality factor (Q) of a resonant circuit describes the ratio between the energy stored in the circuit and the energy dissipated to parasitic resistance or other losses during one cycle of oscillation, as follows:

$$Q \equiv 2\pi \times \frac{\text{energy stored}}{\text{energy dissipated per cycle}} \quad \text{(EQN. 4)}$$

The higher the radiative losses, the lower the quality factor, and the more power is required to generate a magnetic field. Accordingly, in several embodiments, the devices are configured to have a relatively high Q and a low radiation resistance, thus increasing the rate of magnetic field energy oscillation per amount of input power.

Figure 4A:
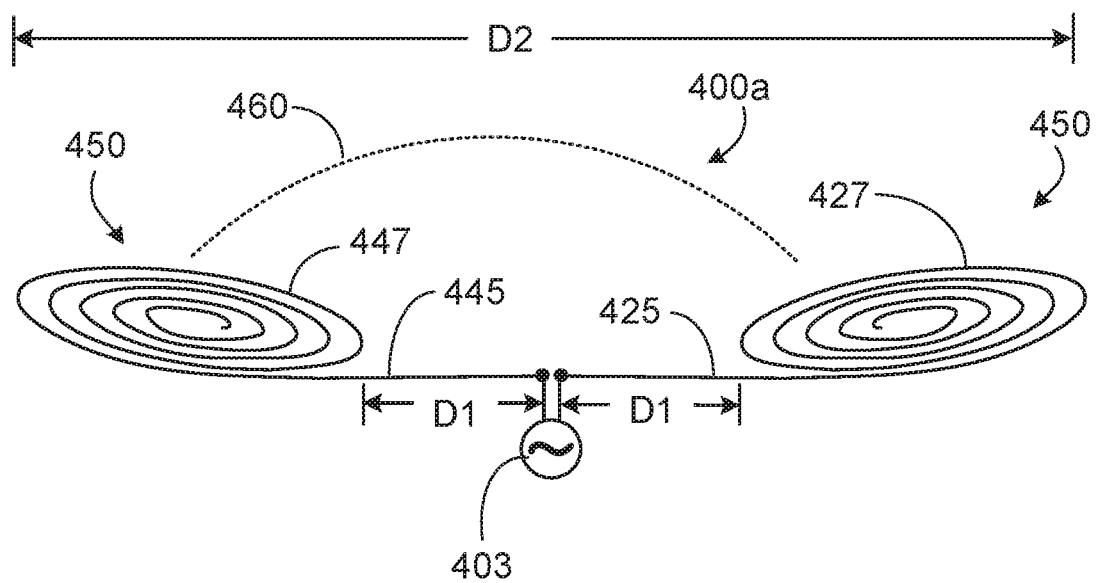
FIGS. 4A to 4B illustrate an example of a particular dipole configuration with coiled ends.
Figure 4B:
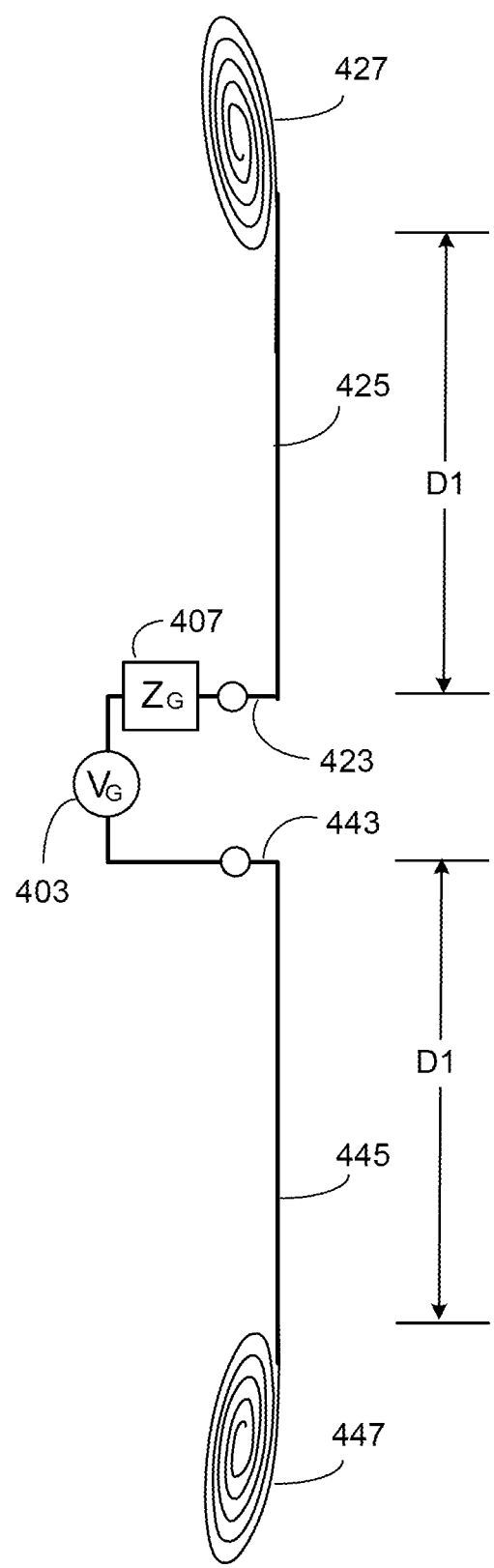

Reduction of other losses, such as parasitic resistance losses, also enhances the Q and hence the power transfer capability of the antenna. Therefore, utilizing hollow-core conductors or "Litz-wire" multifilar conductors to reduce skin effect losses may be advantageous. Magnetic hysteresis or dielectric losses are another source of undesired energy dissipation and so in applications employing such materials it is beneficial to select materials with intrinsically low loss, FIG. 4A is a representative illustration of an amplitude differential circuit 400a. In FIG. 4B, the same amplitude differential circuit 400a is shown with an AC (alternating current) source generator (VG) 403 and first-fourth legs 425, 427, 445, and 447 coupled to the source generator 403. In this embodiment, the first and third legs 425, 445 operate as active elements, and the second and fourth legs operate as charge storage elements 450.

The charge storage elements 450 can have the form of coils, as shown in FIGS. 4A and 4B, or can have other forms in other embodiments. In this illustration, there is a parasitic return element formed by the displacement current 460 (shown schematically) due to the parasitic capacitance between the charge storage elements 450. Here, the displacement current refers to the current that flows through the parasitic capacitance or a dielectric medium (including a vacuum), in response to the change in electric field. The charge storage effect provided by the charge storage elements 450 can result from the intrinsic capacitance of the wire coils, or other structures that form the charge storage elements 450. In this illustration, as long as the current entering the charge storage elements 450 (e.g., from the first leg 425 and the second leg 445) is significantly greater than the displacement current 460 (equivalently, as long as the self-capacitance of the elements 450 is significantly greater than the mutual capacitance between the two elements 450), then there is a monopolar field component, formed by the excess of the current flowing in legs 425 and 445 over the current flowing through the displacement current 460. Another feature of the charge storage elements 450 is that they can have significantly greater charge storage capacity than the active elements 425, 445, which is (at least in part) what distinguishes the charge storage elements 450 from the active elements 425, 445.

The physical size of the amplitude differential circuit 400a can be characterized by the dimensions (e.g., lengths) D1 of the active elements 425, 445, and by the overall dimension D2 of the circuit, which includes the active elements 425, 445, and the charge storage elements 450, but not the source generator 403. The overall dimension D2 should be significantly less than the free space wavelength $\lambda$ of the AC current provided by the generator 403. For example, the overall dimension (e.g., the size of the smallest sphere in which the circuit 400a fits should be substantially less than $0.5\lambda$ (which is a typical dimension of an antenna specifically constructed to radiate). Representative values for D2 can be $0.05\lambda$ or less, $0.04\lambda$ or less, $0.03\lambda$ or less, $0.02\lambda$ or less, or $0.01\lambda$ or less. The wavelength $\lambda$ is related to the frequency of the AC current provided by source generator 403 and is given by:

$$\lambda = v/f \quad \text{(EQN. 5)}$$

where v is the velocity of the electromagnetic wave generated by the source generator 403 in the associated medium. When the electromagnetic wave propagates in free space, $v=c=\sqrt{\mu_0 \varepsilon_0}$ (speed of light), where $\mu_0$ is the permeability of free space, $\varepsilon_0$ is the permittivity of free space.

Because the circuit 400a, when configured as described above, is deliberately constructed to reduce or limit radiative losses, more of the power supplied to the circuit is available to generate a magnetic field. In some implementations, the current provided by the source generator 403 is fed at approximately the center of the active elements 425, 445, as shown in FIG. 4A. In other implementations, the feed point may be offset away from the center. In these implementations, the active elements and the charge storage elements can be selected to have matching (or approximately or roughly matching) impedances, e.g., to reduce signal reflections and the interfaces between these elements. For example, when the active elements 425, 445 are formed from wire, and the charge storage elements also include wire (e.g., a coiled wire), the wires can be selected to have matching impedances. In addition to or in lieu of this matching, the active elements 425, 445 can be selected to match the characteristic impedance (Z0) of the transmission lines 423 and 443.

In some implementations, the active element can be a bare (uncoated) wire. A coating may be used in particular applications, e.g., for corrosion resistance.

Although center-fed half-wavelength dipole antennas (e.g., as shown in FIGS. 3A, 3B) also generate magnetic energy in the near field (at distances much smaller than the wavelength), these center-fed half-wavelength dipole antennas require very large amounts of power supplied from the source generator 303 to generate sufficient magnetic energy to be useful in a typical application. This is because such dipole antennas lose power in the propagating electromagnetic fields that are radiated to the far field. In fact, this tendency to lose power is an inherent characteristic of conventional dipole antennas, which are often specifically designed to radiate. Unlike such conventional dipole antennas, for implementations disclosed herein, a large portion of each quarter wavelength portion of a half wavelength dipole is coiled, looped, wound or otherwise configured to suppress the tendency to radiate propagating electromagnetic waves into the far field (e.g., as shown in FIGS. 4A and 4B). This configuration is in direct contrast to conventional dipole antennas specifically designed to radiate energy into the far field.

The coiled second and fourth legs 427 and 447 in FIGS. 4A and 4B provide sufficient self-capacitance to absorb substantially all the current running through the wires 425 and 445. Suppressing the far field leaves the near-field contribution of the active elements intact.

The characteristic dimension of the amplitude differential circuit shown in FIGS. 4A and 4B is the sum of the length of the first and third legs 425 and 445, e.g., twice D1, as these elements operate as the active elements in a non-loop arrangement.

Figure 5:
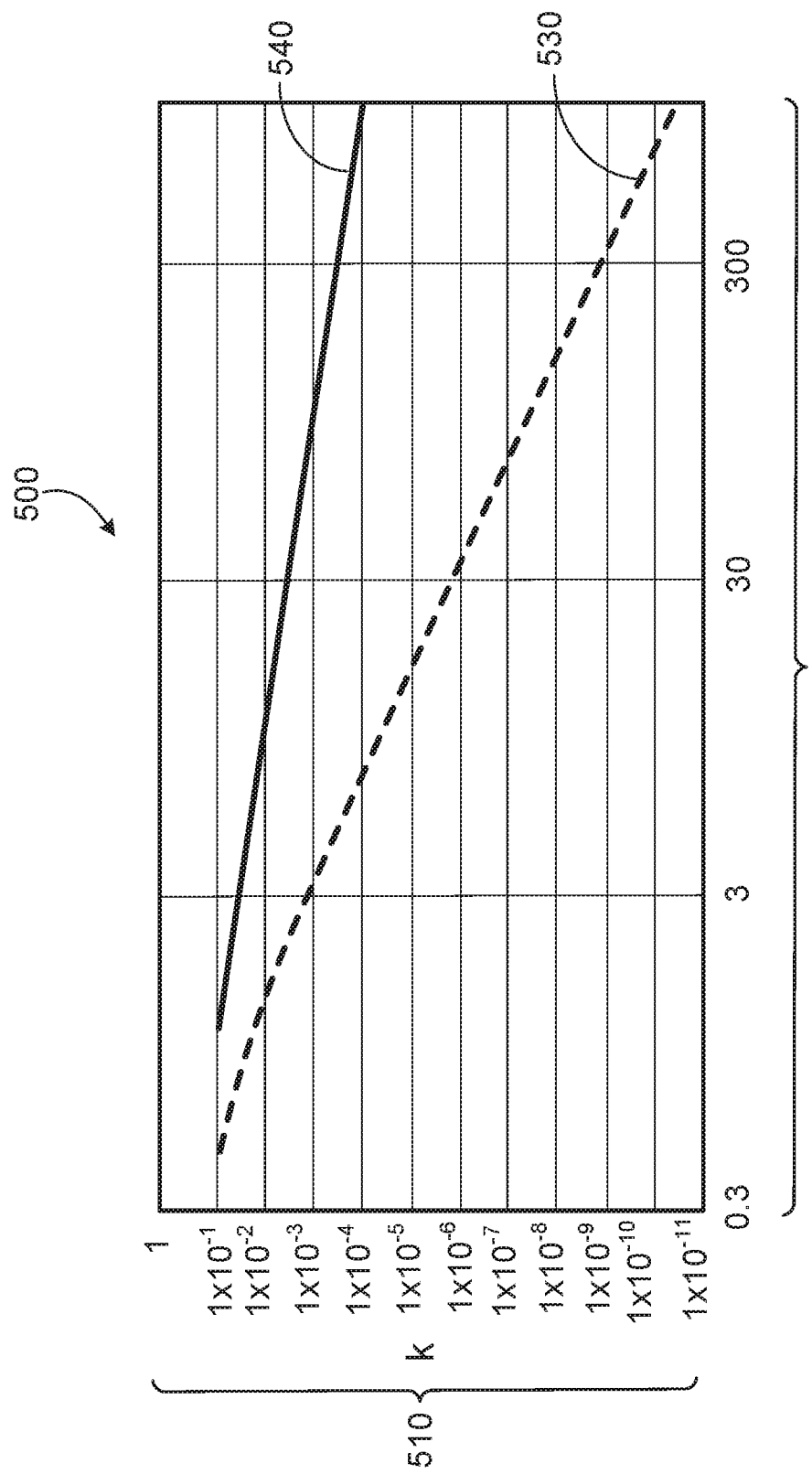
FIG. 5 shows comparative merits of inductive coupling coefficients between two examples of magnetic field devices.

FIG. 5 shows an example of the inductive coupling coefficient (k) between two identical electromagnetic field generators, as a function of separation distance. The vertical axis 510 represents the unitless coupling coefficient (k) and the horizontal axis 520 represents distance, referenced to the characteristic dimension as defined above. For example, "3" on the horizontal axis 520 represents a distance equal to three (3) times the characteristic dimension and "30" represents 30 times the characteristic dimension.

The coupling coefficient is equivalent to the mutual inductance normalized by the geometric mean of self-inductance. According to some embodiments of the present technology, the mutual inductance M of two parallel segments Λ on each of identical magnetic field generators in accordance with the present technology (for example, as shown in FIG. 2A or FIG. 4A) separated by a distance d is given as:

$$M = (2 \times 10^{-7} \text{ H/m}) \times \Lambda \times \left[ \ln\left(\frac{\Lambda}{d} + \sqrt{1 + \frac{\Lambda^2}{d^2}}\right) + \frac{d}{\Lambda} - \sqrt{1 + \frac{d^2}{\Lambda^2}} \right] \quad \text{(EQN. 6)}$$

The coupling coefficient k can be obtained from the mutual inductance M by:

$$k = \frac{M}{\sqrt{L_1 L_2}} \quad \text{(EQN. 7)}$$

where $L_1$ is the self inductance of one element of the link (for example, the transmitter) and $L_2$ is the self inductance of the other element of the link (for example, the receiver). For identical segments, k=M/L.

Based on the foregoing equations, line 530 in FIG. 5 represents the baseline coupling coefficient associated with conventional paired electromagnetic field generators e.g. two loops of the type shown in FIG. 2A. Line 540 illustrates the expected coupling coefficient for paired electromagnetic field generators having a magnetic field generated in accordance with embodiments of the present technology. FIG. 5 accordingly illustrates that paired electromagnetic field generators (e.g., a pair of any of the representative devices described above) can produce an inductive coupling coefficient over significantly greater distances than can paired conventional devices. For example, the distance over which paired conventional devices have a coupling coefficient of 0.01 is about 1.3 characteristic dimensions. For paired electromagnetic field generators in accordance with the present technology, the same coupling coefficient can be obtained at a separation distance of about 10 characteristic dimensions. In addition, for embodiments in which the characteristic dimension increases as a result of the measure taken to enhance the magnetic field generation, the separation distance increases even further as a result.

In some implementations, magnetic coupling is optimized below, for example, ~10 MHz. The application of these techniques below, for example, ~10 MHz may be used to achieve the self-capacitance necessary to enable a "single" wire current flow. Based on this operating range, several light-weight structures can be developed and pursued to enable the necessary self-capacitance. Examples of these approaches folded or interwoven helical coils, Ferrite waveguides, and metamaterial or periodic-waveguide structures.

Figure 6A:
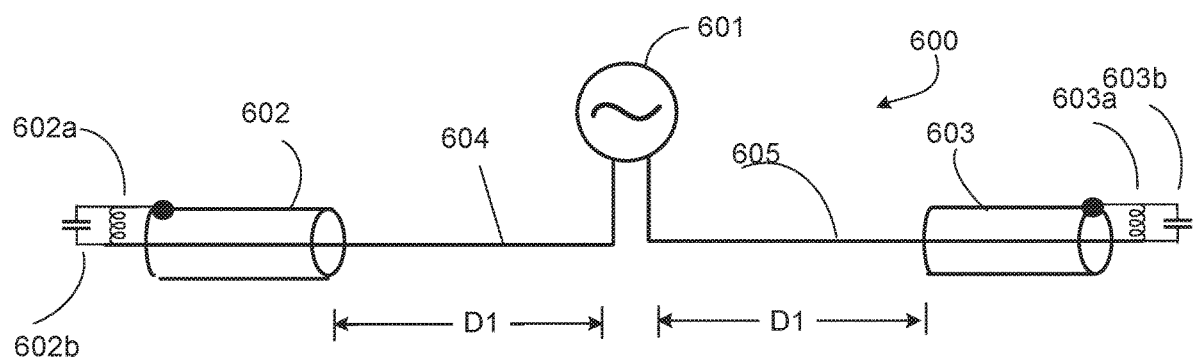
FIGS. 6A to 6F show more detailed examples of the dipole configuration with coiled ends.

FIGS. 6A to 6F illustrate various examples of slow-wave end-loaded antenna structures for suitable near field magnetic field coupling. As illustrated in FIG. 6A, current source 601 drives the left and right arms of the slow-wave end-loaded antenna structure 600. The left arm includes active element 604, charge storage element 602 which further includes inductance load 602a and capacitance load 602b. The right arm likewise includes active element 605, charge storage element 603 which further includes inductance load 603a and capacitance load 603b. In the charge storage elements 602 and 603, the return wire can be turned and wrapped around the center conductor. With this modification, a reflecting discontinuity may be present at the far end of charge storage element 602 (away from the current source 601).

Figure 6B:
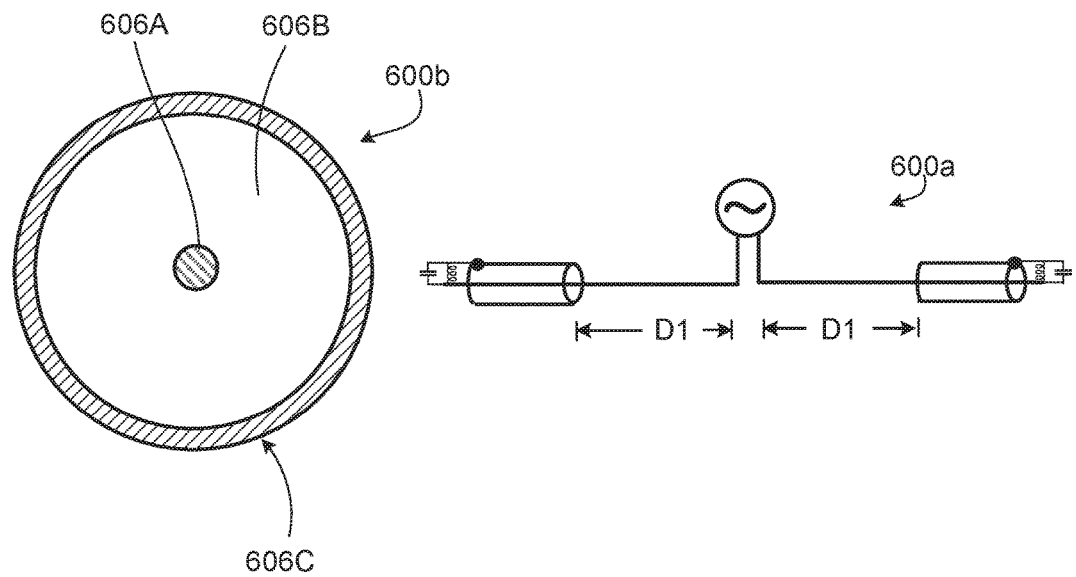

FIG. 6B illustrates another example of slow-wave end-loaded antenna structure 600a, which likewise has a left arm and a right arm, both constructed on a wire structure in which a material with permeability and permittivity both greater than the vacuum (for example, a ferrite) 606B fills the space between the inner conductor 606A and outer conductor 606C.

Figure 6C:
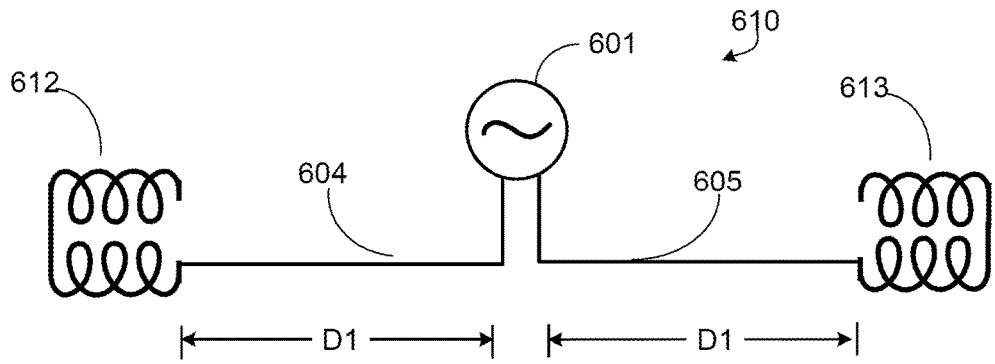

FIG. 6C illustrates an example of slow-wave end-loaded antenna structure 610 with interweaving or folded helical strands of conducting wire 612 on the left arm and interweaving or folded helical strands of conducting wire 622 on the right arm.

Figure 6D:
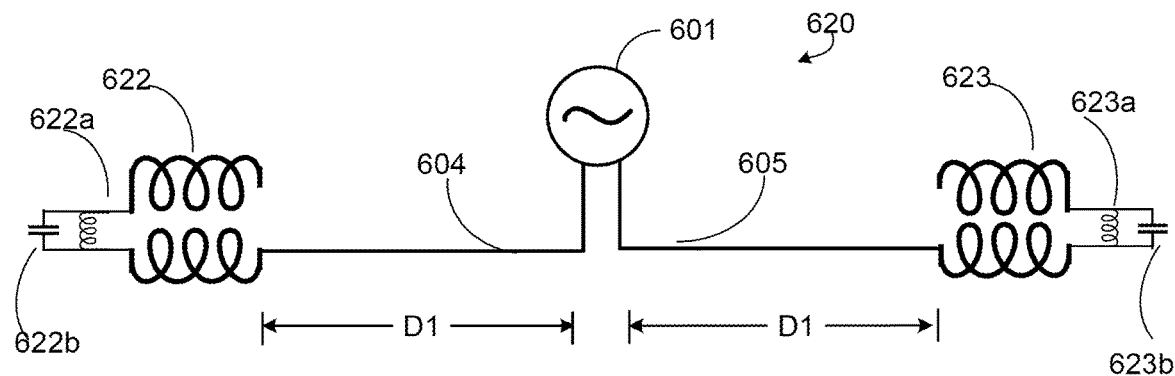

FIG. 6D further illustrates an example of slow-wave end-loaded antenna structure 620. The left arm of structure 620 includes interweaving or folded helical strands of conducting wire 622 with inductance load 622a and capacitance load 622b. The structure 620 also has a right arm that includes or folded helical strands of conducting wire 623 with inductance load 623a and capacitance load 623b.

Figure 6E:
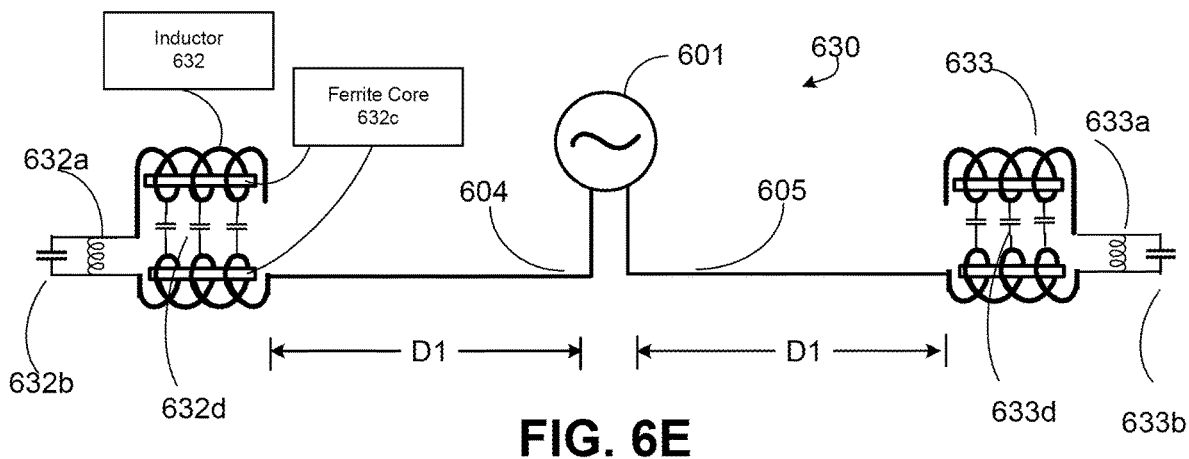

FIG. 6E describes an example of slow-wave end-loaded antenna structure 630. The structure 630 has left and right arms. The left arm has interweaving or folded helical strands of conducting wire 632 connected to inductance load 632a and capacitance load 632b. Interweaving or folded helical strands of conducting wire 632 further extends to form an upper inductor and a lower inductor, each wrapping around ferrite rod 632C and connected via capacitance 632d. The right arm has interweaving or folded helical strands of conducting wire 633 connected to inductance load 633a and capacitance load 633b. Interweaving or folded helical strands of conducting wire 633 further extends to form an upper inductor and a lower inductor, each wrapping around ferrite rod 633C and connected via capacitance 633d. Using discrete capacitors between the upper and lower coils of FIG. 6E, instead of using a sheet or tube of dielectric material (as in 6B), is an example of a periodic-waveguide or so-called 'metamaterial' structure configured with repeating layers of material on a scale smaller than the wavelength but optimized (tuned) to the appropriate ratio to wavelength. When the scattered waves from those interfaces are aligned, a further slowing in the wave propagation speed can be achieved.

Referring to FIGS. 6A to 6E, these cases demonstrate examples of slow-wave end-loaded structures, with FIG. 6B employing a ferrite-filled waveguide, and FIGS. 6C, 6D, and 6E employing interweaving or folded coils. In this context "interweaving" may refer to breaking the helix in to two halves on two coil forms and placing the coils adjacent so that there is capacitive coupling between them, or winding the two halves of the coil on a single form so that there is capacitance between a turn of the first half-coil and a turn of the second-half coil (bifilar winding), or any combination of those techniques. When wrapping the conductors helically around a ferrite core, 100-fold slowdowns of phase velocity are possible as a dielectric waveguide. Such a system confines the propagating wave in the interior of the high dielectric material. Manganese-Zinc Ferrites have dielectric constants in the range of 300 (and higher near material resonances), and magnetic permeabilities ($\mu$) measured in the thousands of Henries (H). In terms of form factors for various applications, such an antenna structure would appear to have a low-enough dimension and mass to be practical for in vehicular receivers.

Referring to FIG. 6B, in some cases, the space between the inner conductor 606A and outer conductor 606C may be filled with a dielectric 606B, as shown in FIG. 6B. Here, the propagation velocity of electromagnetic wave is proportional to $1/\sqrt{\mu\varepsilon}$. Given an increased electric permittivity $\varepsilon$, magnetic permeability $\mu$, or both, the physical length can be shortened. This example particularly embodies ferrite waveguides. Specifically, the two arms are configured as a dielectric and ferromagnetic waveguide.

Figure 6F:
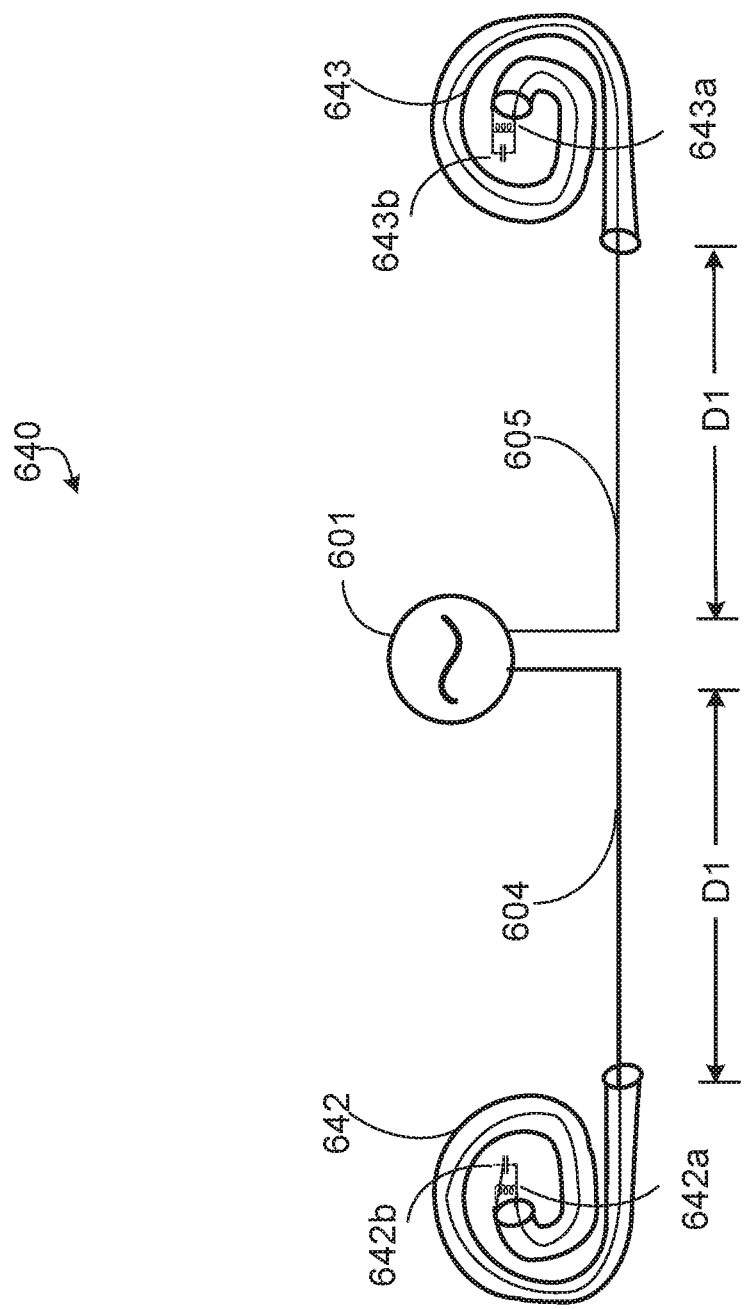

FIG. 6F illustrates an example of slow-wave end-loaded antenna structure 640. The left arm has a coiled end 642 with inductance load 642a and capacitance load 642b. The right arm has a coiled end 643 with inductance load 643a and capacitance load 643b. However constructed, the coiled ends 642 and 643 can be coiled up to take less space, and also to shorten the overall size of antenna structure 640 to reduce radiation resistance. The example of FIG. 6F shows a coiled-up version of the example from FIG. 6B. However, the same coiled end can apply to other embodiments.

Figure 7A:
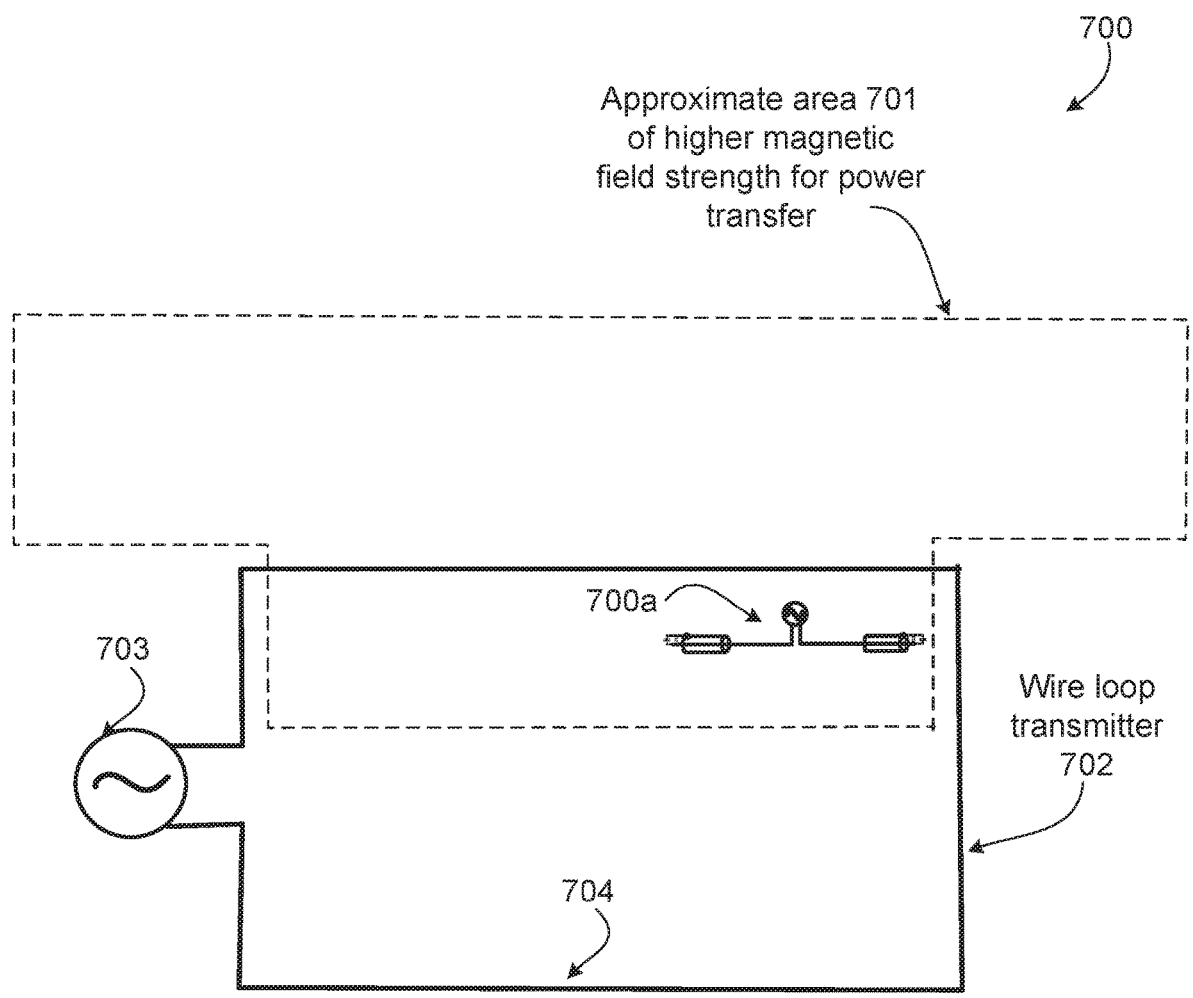
FIG. 7A to 7B illustrate an example of using a ferrite material to implement the dipole configuration.
Figure 7B:
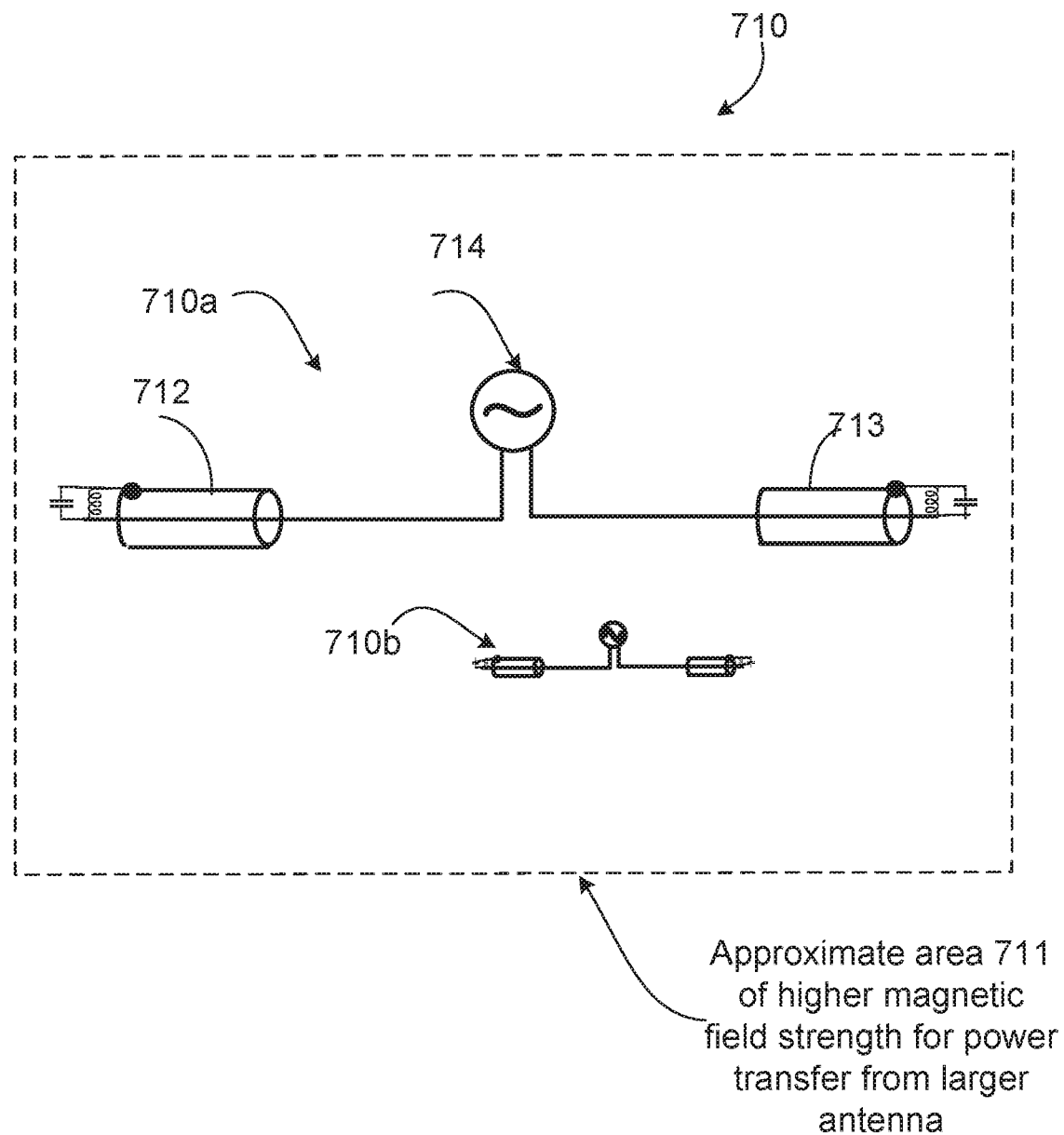

FIGS. 7A and 7B illustrate a number of wireless power transfer scenarios involving slow-wave end-loaded structures. FIG. 7A shows a wire loop transmitter 702 interacting with slow-wave end-loaded structure 700a as a receiver. The wire loop transmitter 702 generally includes a current source 703 supplying current that flows through wire loop 704. Area 701 shows the approximate area of sufficient magnetic field strength for power transfer. As discussed above in association with FIGS. 2A to 2C, area 701 represent an area dominated by the magnetic field generated by a single-wire segment where such magnetic field is not cancelled out by the magnetic field generated by the opposite single-wire of the loop structure. The magnetic field would induce currents in slow-wave end-loaded structure 700a, thereby achieving power transfer. In the case of coupling from a loop type antenna 702 to a dipole type antenna 700a (regardless of which is the receiver or transmitter), the dipole type antenna is generally located much closer to one side of the loop than to the other, whether it is "inside" the loop or "outside" the loop. The dashed area 701 of FIG. 7A highlights this schematically. For reasonable coupling, the distance from the dipole to the "far" side of the loop is expected be at least twice the distance from the dipole to the "near" side of the loop.

FIG. 7B shows a larger slow-wave end-loaded structure 710a acting as a transmitter with another smaller slow-wave end-loaded structure 710b acting as a receiver. The slow-wave end-loaded structure 710a generally includes a current source 714 supplying current that drives active elements 712 and 713. Area 711 shows the approximate area of sufficient magnetic field strength for power transfer. In the case of using two dipoles, the rigid limitation on relative position is removed. However, the greater distance reduces coupling. In particular, the coupling is reduced if the two dipoles are not parallel, with the coupling scaling with the cosine of the angle between the two dipoles—full coupling for parallel, dropping to zero coupling at perpendicular orientations, as discussed.

A number of implementations have been described. Nevertheless, it will be understood that various modifications may be made. Accordingly, other implementations are within the scope of the following claims.

What is claimed is:

1. A method of operating a first antenna capable of magnetically coupling in a reactive near field to a second antenna, the method comprising:
    coupling a magnetic field between the first antenna and the second antenna, the first and second antennas (i) resonant at an operating frequency, and (ii) located within the reactive near field, wherein the reactive near field covers a region that is less than a distance of 0.159 of a free space wavelength for the operating frequency away from the first antenna; and
    providing a receiving system with a threshold amount of wireless inductive power exceeding 1 watt,
    wherein each of the first and second antennas are sized to fit inside a spherical volume with a diameter less than 1/20 of a free space wavelength of the operating frequency;
    wherein energy dissipated to far-field radiation, per cycle, due to circulating currents from the first antenna is less than ½ the peak energy stored in the magnetic field; and
    wherein one or both of the first antenna and the second antenna is a dipole resonant at the operating frequency.

2. The method of claim 1 wherein: coupling the magnetic field and providing the receiving system with the threshold amount of wireless inductive power are performed on a transmitting system; and
    further comprising supplying, at the operating frequency driving the first antenna, an alternating current to create the magnetic field.

3. The method of claim 1 wherein: coupling the magnetic field and providing the receiving system with the threshold amount of wireless inductive power are performed on the receiving system; and
    further comprising receiving an alternating current from the second antenna.

4. The method of claim 1 wherein coupling the magnetic field includes limiting energy dissipated to far-field radiation, associated with circulating currents in transmission, to less than one third of peak energy stored in the magnetic field on a per cycle basis.

5. The method of claim 1 wherein the operating frequency is less than or equal to 10 MHz.

6. The method of claim 1 wherein one or both of the first and second antennas has at least 10% of peak current for an alternating current for an unpaired wire that is not cancelled by an opposing current within the same antenna.

7. The method of claim 6 wherein coupling the magnetic field includes generating a magnetic field with a nonzero monopolar component.

8. The method of claim 1 further comprising preselecting the operating frequency.

9. The method of claim 1 further comprising using feedback tuning of one or both antennas to maintain the operating frequency in response to component tolerances, temperature variation, drift, or proximity effect of other structures within the reactive near field.

10. The method of claim 1 further comprising varying the operating frequency to prevent unauthorized reception of inductive power.

11. The method of claim 1 in which one of the first antenna and the second antenna is the dipole and one of the first antenna and the second antenna is a coil, in which the dipole is located asymmetrically to the coil.

12. The method of claim 1 wherein one or more of the first antenna and the second antenna are configured in a dipole configuration with aggregated inductor and capacitive components on remote portions.

13. The method of claim 12 wherein one or more of the first antenna and the second antenna includes a configuration with a slow-wave transmission line on the remote portions for the dipole.

14. The method of claim 12 wherein one or more of the first antenna and the second antenna includes a configuration with a folded end-loaded structure that includes a ferrite-core coil with capacitive loading between two halves of the the folded end-loading structure for the dipole.

15. The method of claim 1 wherein one or more of the first antenna and the second antenna includes a configuration with a folded end-loaded structure that includes a ferrite-core coil with aggregated LC circuit matching at a fold in the end-loading structure for the dipole.

16. The method of claim 1 wherein one or more of the first antenna and the second antenna includes a configuration with a ferrite-filled transmission line with a shorted end for the dipole.

17. The method of claim 1 wherein one or more of the first antenna and the second antennas includes a configuration with a ferrite-filled transmission line where the center and shield conductors are connected through an aggregated LC matching circuit for the dipole.

18. The method of claim 1 wherein providing the receiving system with a threshold amount of wireless inductive power exceeding 1 watt includes providing wireless inductive power exceeding 100 watts.

19. The method of claim 1 wherein the energy dissipated to far-field radiation, per cycle, due to circulating currents from the second antenna is less than ½ the peak energy stored in the magnetic field.

20. A system operating a first antenna capable of magnetically coupling in a reactive near field to a second antenna, the system comprising:

coupling a magnetic field between the first antenna and the second antenna, the first and second antennas (i) resonant at an operating frequency, and (ii) located within the reactive near field, wherein the reactive near field covers a region that is less than a distance of 0.159 of a free space wavelength for the operating frequency away from the first antenna; and a power system associated with the first antenna providing a receiving system with a threshold amount of wireless inductive power exceeding 1 watt, wherein each of the first and second antennas have a spherical volume with a diameter less than ¹⁄₂₀ of a free space wavelength of the operating frequency;

wherein energy dissipated to far-field radiation, per cycle, due to circulating currents from the first antenna is less than ½ the peak energy stored in the magnetic field; and wherein one or both of the first antenna and the second antenna is a dipole resonant at the operating frequency.

21. The system of claim 20 wherein the first antenna and the power system reside within a transmitting system, and
the power system supplies, at the operating frequency driving the first antenna, an alternating current to create the magnetic field.

22. The system of claim 20 wherein the first antenna and the power system reside within a receiving system; and
the power system receives an alternating current from the second antenna.

23. The system of claim 20 wherein the first antenna and the power system limit energy dissipated to far-field radiation, associated with circulating currents in transmission, to less than one third of peak energy stored in the magnetic field on a per cycle basis.

24. The system of claim 20 wherein the operating frequency is less than or equal to 10 MHz.

25. The system of claim 20 wherein one or both of the first and second antennas has at least 10% of peak current for an alternating current for an unpaired wire that is not cancelled by an opposing current within the same antenna.

26. The system of claim 20 wherein the first antenna generates a magnetic field with a nonzero monopolar component.

27. The system of claim 20 further comprising a frequency controller configured to preselect the operating frequency.

28. The system of claim 27 wherein the frequency controller uses feedback tuning of one or both antennas to maintain the operating frequency in response to component tolerances, temperature variation, drift, or proximity effect of other structures within the reactive near field.

29. The system of claim 20 further comprising a frequency controller to vary the operating frequency to prevent unauthorized reception of inductive power.

30. The system of claim 20 in which one of the first antenna and the second antenna is the dipole and one of the first antenna and the second antenna is a coil, in which the dipole is located asymmetrically to the coil.

31. The system of claim 20 wherein one or more of the first antenna and the second antenna are configured in a dipole configuration with aggregated inductor and capacitive components on remote portions.

32. The system of claim 31 wherein one or more of the first antenna and the second antenna includes a configuration with a slow-wave transmission line on the remote portions for the dipole.

33. The system of claim 31 wherein one or more of the first antenna and the second antenna includes a configuration with a folded end-loaded structure that includes a ferrite-core coil with capacitive loading between two halves of the folded end-loading structure for the dipole.

34. The system of claim 20 wherein one or more of the first antenna and the second antenna includes a configuration with a folded end-loaded structure that includes a ferrite-core coil with aggregated LC circuit matching at a fold in the end-loading structure for the dipole.

35. The system of claim 20 wherein one or more of the first antenna and the second antenna includes a configuration with a ferrite-filled transmission line with a shorted end for the dipole.

36. The system of claim 20 wherein one or more of the first antenna and the second antennas includes a configuration with a ferrite-filled transmission line where the center and shield conductors are connected through an aggregated LC matching circuit for the dipole.

37. The system of claim 20 wherein the energy dissipated to far-field radiation, per cycle, due to circulating currents from the second antenna is less than ½ the peak energy stored in the magnetic field.

\* \* \* \* \*